United States Patent [19]
Sakai

[11] Patent Number: 5,861,930
[45] Date of Patent: Jan. 19, 1999

[54] COLOR LIQUID CRYSTAL SUBSTRATE AND A MANUFACTURING METHOD THEREOF

[75] Inventor: Yasuto Sakai, Osaka, Japan

[73] Assignee: Nippon Sheet Glass Co., Ltd., Osaka, Japan

[21] Appl. No.: 862,735

[22] Filed: May 23, 1997

[30] Foreign Application Priority Data

May 31, 1996 [JP] Japan ................................. 8-137855
Jan. 21, 1997 [JP] Japan ................................. 9-008333

[51] Int. Cl.⁶ .................................................. G02F 1/1325
[52] U.S. Cl. .................................................. 349/106
[58] Field of Search ................................. 349/106, 122, 349/138

[56] References Cited

U.S. PATENT DOCUMENTS 4,938,569 7/1990 Tsunoda et al. .................... 349/106

FOREIGN PATENT DOCUMENTS

| | | |
|---|---|---|
| 61-233720 | 10/1986 | Japan . |
| 5-37453 | 6/1993 | Japan . |
| 6-242310 | 9/1994 | Japan .................. 349/106 |
| 7-703 | 1/1995 | Japan . |
| 7-62086 | 7/1995 | Japan . |
| 7-62087 | 7/1995 | Japan . |

*Primary Examiner*—William L. Sikes
*Assistant Examiner*—James A. Dudek
*Attorney, Agent, or Firm*—Merchant, Gould, Smith, Edell, Welter and Schmidt

[57] ABSTRACT

In a color liquid crystal substrate, in which a plurality of color filter elements are formed on a transparent substrate, a primary coating of an organic silicon compound containing oxide particles is formed on the color elements, and a secondary coating of a silicon dioxide is formed on said primary coating. Further, the oxide particles contained in the primary coating are concentrated and fill-in the recess portions defined among the neighboring color filter elements.

20 Claims, 4 Drawing Sheets

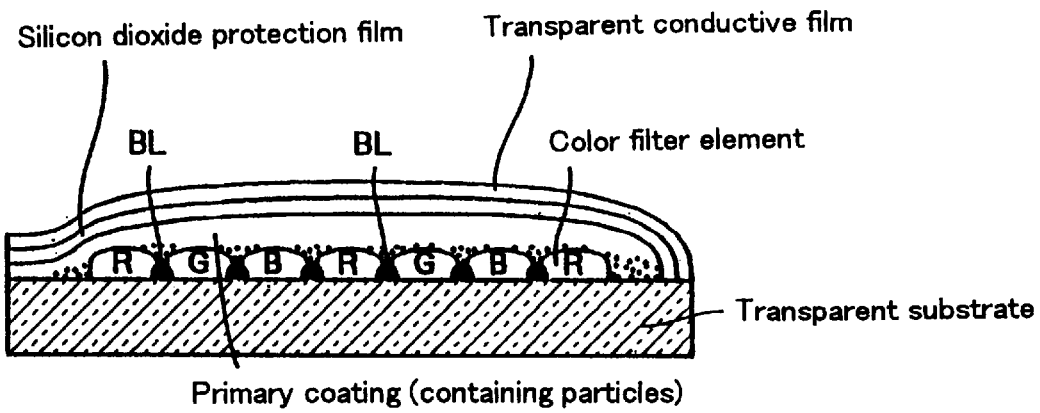
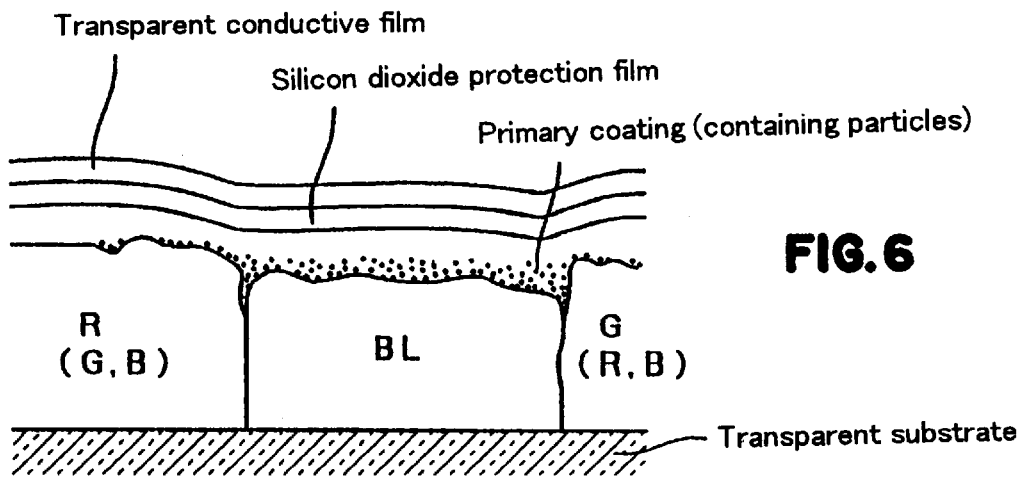
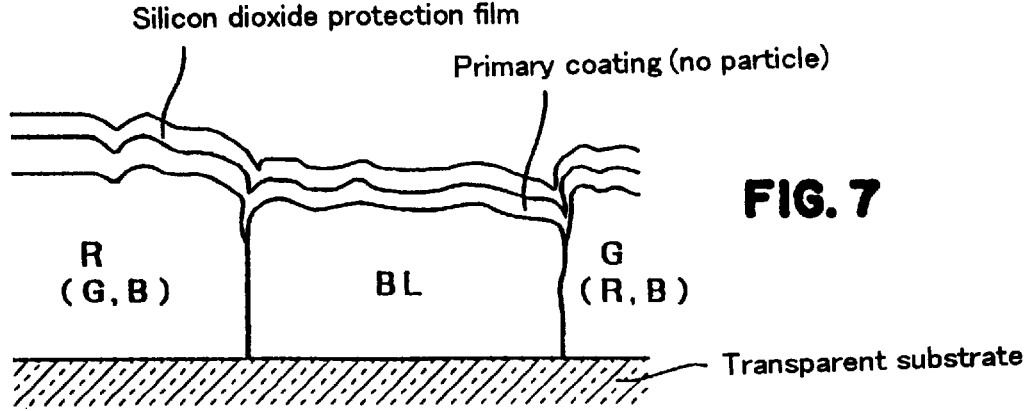

FIG. 8
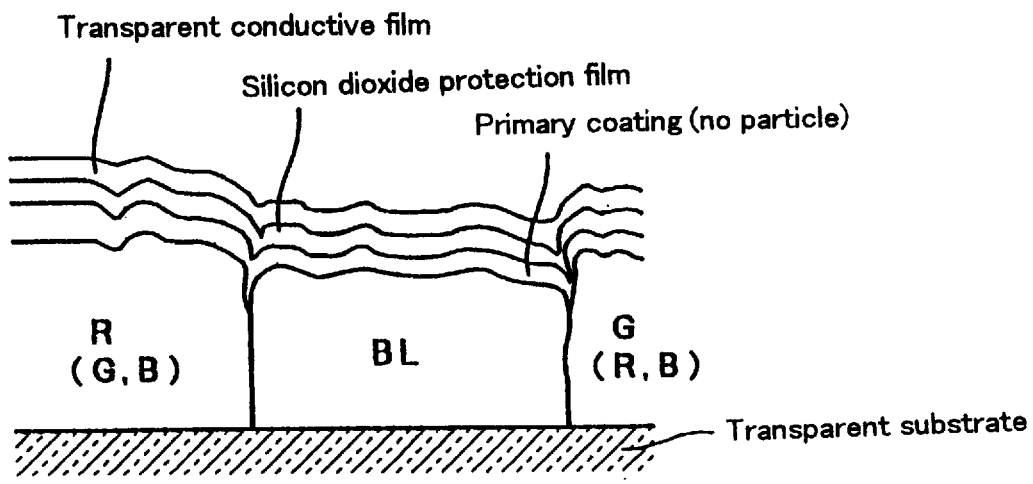
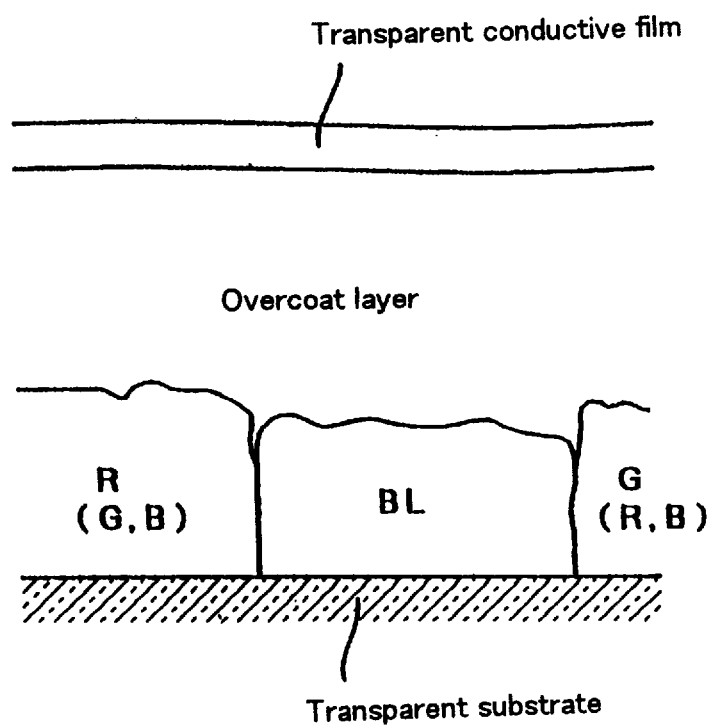
FIG. 9

COLOR LIQUID CRYSTAL SUBSTRATE AND A MANUFACTURING METHOD THEREOF

BACKGROUND OF THE INVENTION

1. Field of the Invention

The present invention relates to a substrate and a manufacturing method thereof, which is used especially as a so-called super twisted nematic type (STN) color liquid crystal display.

2. Description of Prior Art

In a basic structure of a color liquid crystal display, a color filter layer is formed on the surface of a glass substrate, on which a transparent electrode is provided. However, since sodium (Na) ions in the glass substrate and/or other ions in the color filter elute into the liquid crystal and shorten the lifetime of such a structure, there has been proposed a construction in which an ion barrier layer is provided between the color filter and the transparent layer (Japanese Laid Open Patent No. 61-233720 (1986)).

The color filter is an assembly of elements including red (R), green (G) and blue (B) filters (in some examples, black stripe (BL) elements are further added thereto). In the manufacturing method thereof, for example, an exposure process is performed on the surface of a black color light-sensitive resin through a mask, and a line-shaped black stripe is formed by removing the non-exposed portion with a developer such as alcohol. Further, the dot-shaped red color elements are formed by developing a red color light-sensitive resin, and green color elements and blue color elements are formed in the same manner.

Between each of the elements formed in such manner, especially between the black stripe elements (BL) and the others (R, G, B), there appears a step-like difference of a few hundred nm as shown in FIG. 9.

In the case where a transparent conductive film, such as an ITO(indium tin oxide) and so on, is formed on the uneven surface of such a color filter directly and further where a patterning treatment is performed on it, poor patterning and/or circuit breakage occur due to an undesirable influence of the unevenness.

Therefore, in the above document (Japanese Laid Open Patent No. 61-233720) and others, a construction has been proposed in which an overcoat layer of a resin material is formed on each of the elements of the color filter so as to form a transparent conductive layer thereon.

Since the overcoat layer is provided for achieving flatness on the surface of the color filter as mentioned above, if it is too thin, the overcoat layer cannot accomplish the intended purpose thereof.

However, if it is formed in a thickness sufficient to achieve good surface evenness, a gas is generated when the transparent conductive layer is formed on the overcoat layer. Due to the gas, the productive efficiency is greatly decreased, the conductivity of the transparent conductive layer is deteriorated, and poor patterning results due to the change in etching characteristics. Further, even after production is completed, when the color liquid crystal is used under very heavy dynamic conditions, such as in a monitor for a television or in a navigation apparatus for an automobile, the gas generated from the overcoat layer (or from the color filter or the black matrix) attacks the transparent conductive film and deteriorates the durability thereof.

Therefore, as disclosed in Japanese Patent Publication No. 5-37453 (1993), Japanese Patent Publication No. 7-703 (1995), Japanese Patent Publication No. 7-62086 (1995) and Japanese Patent Publication No. 7-62087 (1995), by applying a coating of silicon dioxide to the color liquid crystal, it is possible to form a layer of an inorganic oxide such as silicon dioxide, or a layer of a nitride, on the color filter or on the overcoat layer so as to prevent the generation of gas therefrom.

In the disclosure of Japanese Patent Publication No. 5-37453 (1993), Japanese Patent Publication No. 7-703 (1995), Japanese Patent Publication No. 7-62086 (1995) and Japanese Patent Publication No. 7-62087 (1995), the thickness of the sub-layer of the silicon dioxide is 100 nm, but this is not enough to obtain the required flatness or evenness thereby.

On the contrary thereto, if making the layer thickness of the sub-layer thick enough for obtaining the required flattening, it is impossible to prevent the gas from being generated.

SUMMARY OF THE INVENTION

According to the present invention, a color liquid crystal substrate, having a transparent substrate on which a plurality of color filter elements are formed, comprises a primary coating formed on said color elements and comprising an organo silicon compound containing oxide particles, and a secondary coating formed on said primary coating and comprising a silicon dioxide, wherein the oxide particles contained in said primary coating are concentrated in recess portions which are defined among the neighboring color filter elements.

By concentrating the oxide particles in the recess portions defined among the color filter elements, sufficient flattening can be obtained without increasing the thickness of the primary coating.

It should be noted that in this specification, it is assumed that every color filter element group includes at least one black stripe (BL) element, as shown in FIG. 1.

In the color liquid crystal substrate defined in claim 10, which has a transparent substrate on which a plurality of color filter elements are formed, a coating of an organo silicon compound containing oxide particles is formed on the color filter elements, and the oxide particles contained in the coating are concentrated in recess portions which are defined among the neighboring color filter elements.

By concentrating the oxide particles in the recess portions defined among the color filter elements, sufficient flattening can be obtained without increasing the thickness of the primary coating.

As the oxide particle mentioned above, silicon dioxide, alumina, titania, zirconia, etc., are preferable from the viewpoints of transparency and electric insulation, and in particular, colloidal silica is the most preferable because it has a refraction index near to that of the organic silicon film and it makes it possible to maintain the necessary transparency.

As the colloidal silica, there is a sol (colloidal solution) which is obtained by dispersing silica particles into water or alcohol, or a dried powder obtained by removing the disperse radical from the sol. The diameter of the colloidal silica is preferentially in the range of 5 to 50 nm.

The reason for selecting the diameter of the colloidal silica from 5 nm to 50 nm is that if it exceeds 50 nm, the organic silicon film obtained thereby has a haze on it, and it is therefore unsuitable to be applied to the substrate for use of a liquid crystal display. If it is less than 5 nm, it increases the production cost.

The thickness of the organic silicon film is preferably to be greater than 0.1 μm. This is because if it is less than 0.1 μm, it is impossible to fully obtain the required flatness. While there is no upper limit to the thickness of the organic silicon, the thickness of the organic silicon film is preferable to be as thin as possible but at least more than 0.1 μm.

In the manufacturing method of a color liquid crystal substrate defined in claim 7, a primary coating containing oxide particles is formed by depositing and curing a solution including an organic silane or a hydrolysate thereof, which is expressed by the following equation, and oxide particles, and a secondary coating of silicon dioxide on the primary coating is formed by contacting the primary coating with a hydrofluosilicic acid solution which is supersaturated with silicon dioxide:

$$R^1_n Si(R^2)_{4-n}$$

wherein the R1 is a hydrocarbon group of 1 to 6 carbon number, a vinyl group, a methacryloxy group, an epoxy group, an amino group, a mercapto group, or an organic group including fluorine or chlorine;

R2 is a combined group of one or a plurality of groups selected from an alkoxy group, an alkoxyalkoxy group, an acetoxy group or a chlorine, and n is 0 to 4.

And, in the manufacturing method of a color liquid crystal substrate defined in claim 16, a coating of a system containing oxide particles is formed by painting and curing a solution including an organic silane or hydrolysate thereof, which is expressed by the following equation, and oxide particles:

$$R^1_n Si(R^2)_{4-n}$$

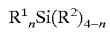

wherein the $R^1$ is a hydrocarbon group of 1 to 6 carbon number, a vinyl group, a methacryloxy group, an epoxy group, an amino group, a mercapto group, or an organic group including fluorine or chlorine;

$R^2$ is a combined group of one or a plurality of groups selected from an alkoxy group, an alkoxyalkoxy group, an acetoxy group or a chlorine; and n is 0 to 4.

Here, the ratio of oxide particles (silica) in the solution (colloidal silica) of the organic silane or hydrolysate thereof is preferably 2 to 40 percent by weight.

This is because if it is less than 2 percent by weight, the effect on the flatness of the substrate is small, while if it exceeds 40 percent by weight, a drawback happens in that adhesion of the color filters onto the substrate becomes weak, since the ratio of the organic silane or hydrolysate thereof which is expressed by the above equation is small.

Here, because a resin material is generally used for the color filters and the black stripe, in the manufacturing method of a substrate as defined in claim 7, it is difficult to increase the temperature of the substrate when forming the silicon dioxide film thereon, therefor, it is impossible to apply an ordinary vacuum method and/or a sol gel method which necessitates baking at high temperature afterward.

However, according to the present invention, by using so called a liquid-phase deposition method of contacting the hydrofluosilicic acid solution which is supersaturated with the silicon dioxide, the color filters and the black matrix are not deteriorated since this step is performed at the temperature of room air or up to about 60° C.

Here, as a method for obtaining the solution for treatment in the liquid-phase deposition method, i.e., the solution which is supersaturated with the silicon dioxide, there are various methods, including a method of adding boric acid into the solution for treatment, a method of dissolving metallic aluminum, a method of adding water, a method of changing the solution temperature, etc., and also other method(s) can be applied in so far as it(they) achieve the same effect.

As for the thickness of the silicon dioxide coating (secondary coating) obtained by a liquid-phase deposition method, it is preferable to be more than 5 nm. Otherwise, it is difficult to fully prevent the gas generation from the color filters and the black stripe matrices.

As the organic silane compound which is presented by the above general equation $R^1_n Si(R^2)_{4-n}$, the following is listed as representative examples: tetramethylsilane, trimethylmethoxysilane, dimethyldimethoxysilane, methylmetrithoxysilane, tetramethoxysilane, phenyltrimethoxysilane, phenylmethyldimethoxysilane, vinyltriethoxysilane, vinyltris(β-methoxyethoxy) silane, vinyltriacetoxysilane, γ-methacryloxypropyltrimethoxysilane, γ-aminopropyltriethoxysilane, N-(β-aminoethyl)-γ-aminopropyltriethoxysilane, N-bis(β-didroxyethyl)-γ-aminopropyltriethoxysilane, N-(β-aminoethyl)-γ-aminopropyl(methyl)dimethoxysilane, γ-chloropropyltrimethoxysilane, γ-mercaptopropyltrimethoxysilane, 3.3.3-trifluoropropyltrimethoxysilane, γ-glycidoxypropyltrimethoxysilane, β-(3.4-epoxycyclohexyl)ethyltrimethloxysilane, methyltrichlorosilane, dimethyldichlorosilane, trimethylchlorosilane, and tetrachlorosilane, etc.

The hydrolysate of the silicon compound, which is presented by the above general equation, includes those in which all or part of the alkoxy group, alkoxyalkoxy group, acyloxy group and/or chlorine of the above-mentioned silicon compounds are replaced by hydroxy groups, and those in which the replaced hydroxy groups are mutually condensed in a part naturally. Those hydrolysates can be obtained by a hydrolysis under the existence of acid in a mixed solution, such as with water and alcohol.

Further, in the manufacturing method of a substrate defined in claim 16, the temperature for drying after painting the coating film is preferably greater than 120° C. The reason for this is that the organic components contained in the coating film and/or any hydroxy group existing on the surface of the oxide particles react according to any increase of heating temperature applied to the coating film after painting thereof, and as a result the bridging density becomes greater. Therefore, if the coating film is provided with a gas barrier and has anti-chemical characteristics, then it does, not require that the silicon dioxide film is deposited on the surface thereof For achieving this, the temperature must be more than 120° C., and preferably more than 160° C.

However, because a resin material is generally used for the color filters and the black stripe, the upper limit of the temperature for drying is limited depending on the resin materials so used, and generally speaking, it is around 250° C.

Further, in addition to the above-mentioned method, the color filters and the black matrix can be formed by any one of several other methods, including a dispersing pigment method, a film transferring method, a dying method, a printing method, an electron attachment method, etc.

BRIEF DESCRIPTION OF THE DRAWINGS

FIG. 2 is an enlarged cross-sectional view of a principal portion of the substrate shown in FIG. 1; in particular.

FIG. 4 is an enlarged cross-sectional view of a principal portion of the substrate shown in FIG. 3; in particular.

FIG. 5 is a cross-sectional view of substrate on which a transparent conductive film is formed;

FIG. 6 is an enlarged cross-sectional view of a principal portion of the substrate shown in FIG. 5;

FIG. 7 is a cross-sectional view of a substrate of a comparative example 1 on which a secondary coating is formed;

FIG. 8 is a cross-sectional view of a substrate of a comparative example 1 on which a transparent conductive coating is formed; and FIG. 9 is a cross-sectional view of a conventional substrate.

DETAILED DESCRIPTION OF PREFERRED EMBODIMENTS

Hereinafter, embodiments according to the present invention will be fully explained by referring to the attached drawings.

EXAMPLE 1

Figure 1:
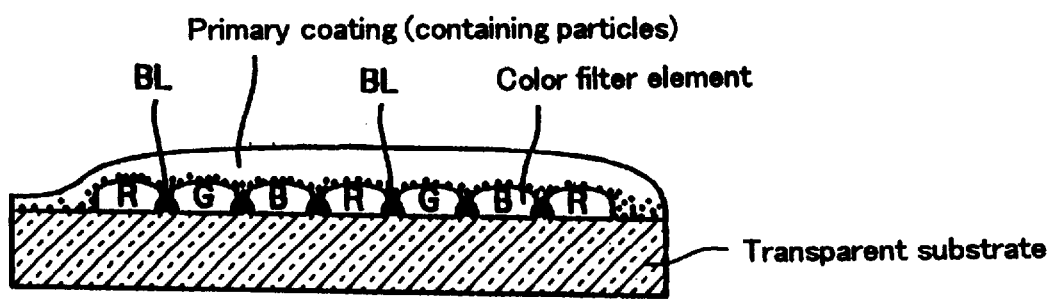
FIG. 1 shows a cross-sectional view of a substrate of the present invention on which a preliminary coating is formed.

As shown in FIG. 1, color filter elements (R, G, B) and black stripes (BL) are formed on a glass substrate as a transparent substrate by a pigment dispersing method. The size of the color filter elements is 300 $\mu$m×90 $\mu$m for one element thereof.

On the other hand, 200 g of methyltrimethoxysilane, 300 g of colloidal silica (tradename "SNOWTECH C", produced by the NISSAN CHEMICAL INDUSTRY CO., LTD.; solid body 20%), and an appropriate amount of acetic acid are combined and mixed for an hour under the condition of being externally cooled, and the mixture is let stand for a day under room temperature. To 150 g of the hydrolysate obtained in this manner, 30 g of an ethanol, 0.5 g of an ammonium chloride and an appropriate amount of a flow control material are added and the coating material is obtained.

The transparent substrate is coated with the coating material as shown in FIG. 1, and is dried in a hot-air drying furnace at 180° C. for 2 hours, thereby a primary coating film is cured and formed thereon. As is clear from FIGS. 2(a) and 2(b) showing the typical substrate of this process in an enlarged view, the particles of silicon dioxide are concentrated in the recess portions defined among the color filter elements (R, G, B) and the black stripes (BL), and thereby the primary film is flattened.

FIG. 2 (b) shows an embodiment in which the particles are contained throughout the whole body of the primary film. In this case, the particles occupy almost the same volume of that occupied by the primary coating film, and the organic silicide particles fill-in the boundary between the particles. At the same time that the silicon dioxide particles are buried in the recess portions, the surface of the primary coating film is substantially formed by an assemblage of the organic silicide particles, thereby being flattened. Here, the thickness of the primary film is about 250 nm.

Figure 2A:
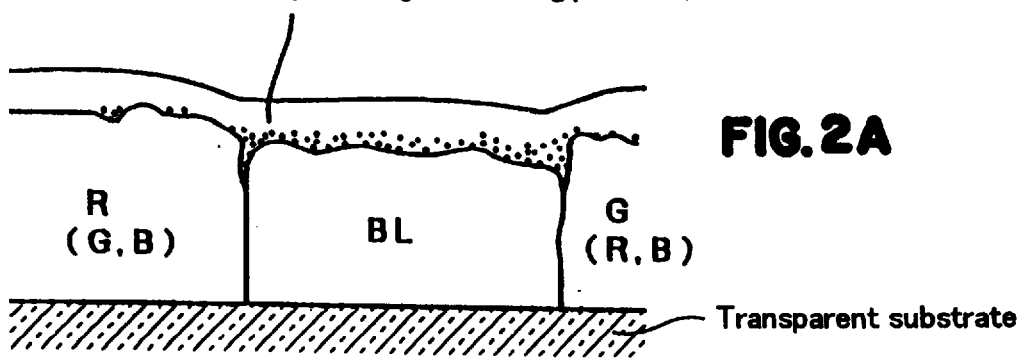
FIG. 2(a) shows a condition where particles of silicon dioxide are filled mainly in a recess portion.
Figure 2B:
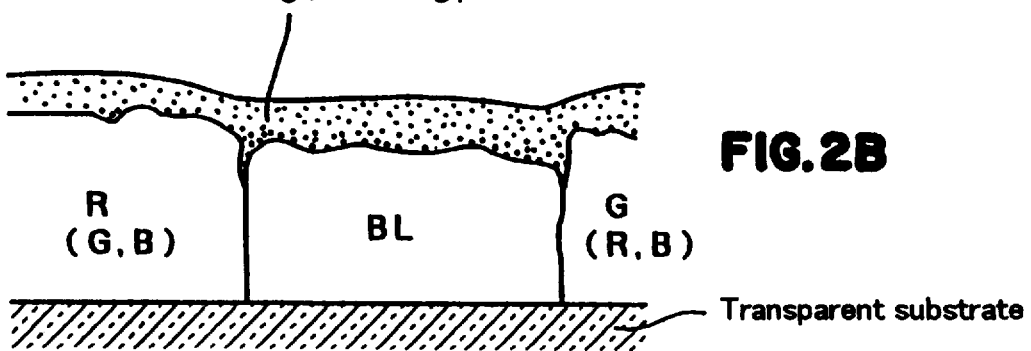
FIG. 2(b) shows a condition where particles of silicon dioxide are dispersed throughout the preliminary coating as a whole.

Now, by saying that the particles of the silicon dioxide are concentrated in the recess portions among the color filter elements (R, G, B) and the black stripes (BL), it is meant that they are filling-in the recess portions, as shown in FIG. 2(a), or that they are forming almost the whole body of the primary coating as well as filling in the recess portions, as shown in FIG. 2(b).

Figure 3:
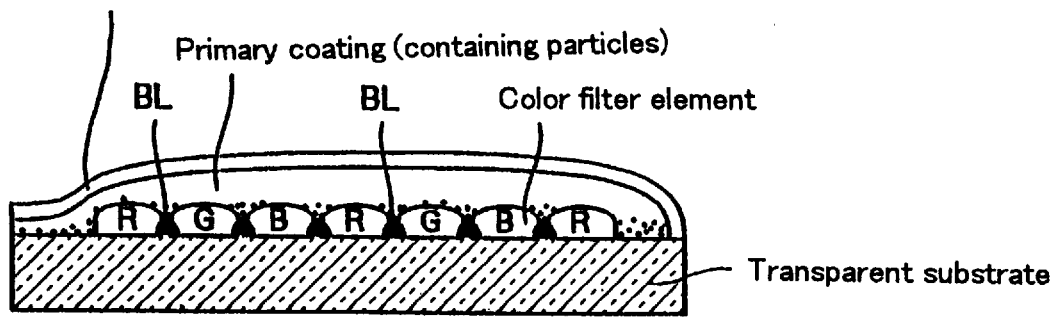
FIG. 3 is a cross-sectional view of a substrate of the present invention on which a secondary coating is formed.
Figure 4A:
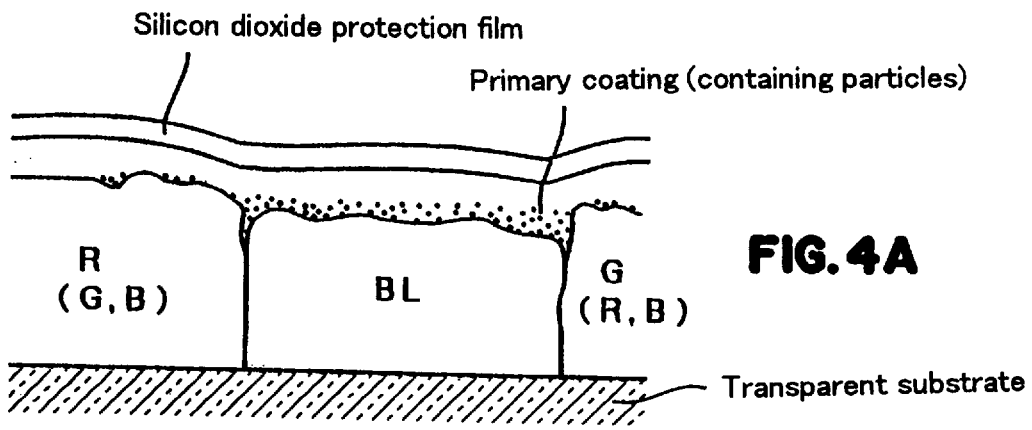
FIG. 4(a) shows a condition where particles of silicon dioxide are filled mainly in a recess portion.
Figure 4B:
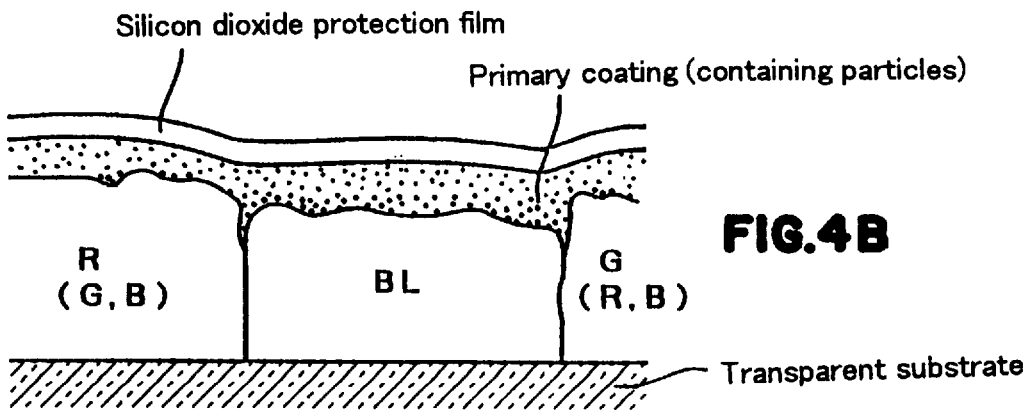
FIG. 4(b) shows a condition where particles of silicon dioxide are dispersed throughout the secondary coating as a whole.

Next, the glass substrate formed with the primary coating is dipped in the hydrofluosilicic acid solution at a concentration of 2.6 mol/liter, which is supersaturated with silicon dioxide, for two (2) hours, thereby forming a silicon dioxide protection film (a secondary coating) on the primary coating, as shown in FIG. 3 and FIGS. 4(a) and 4(b), which are enlarged views of FIG. 3.

During this treatment, the temperature of the solution for the treatment is at 35° C. Measuring the thickness of the silicon dioxide coating formed on a surface of a silicon wafer which is dipped together with the glass substrate by means of ellipsometry, it is found to be about 10 nm.

And by measuring the surface condition of the glass substrate, on which the color filters and the black stripes are formed, by a so-called prove-type level meter, the maximum difference in evenness or levelness is found to be around 600 nm.

On the other hand, when the same measurement is carried out on the surface of the substrate on which the coating is formed according to the present invention, the maximum difference in evenness or levelness is found to be around 100 nm.

An ITO film is formed on the surface of the obtained surface of the glass substrate by forming the primary and secondary coatings, as shown in FIG. 5 and FIG. 6, which is an enlarged view thereof.

The ITO film of thickness 300 nm is obtained under the conditions of mixing an appropriate amount of oxygen into an argon atmosphere for film growing and under a pressure of $3\times10^{-3}$ Torr, by a magnetron sputtering method.

By cutting the glass substrate obtained by the above method, formed with the primary coating, the secondary coating and the ITO coating thereon, three sample pieces 10 cm×10 cm in dimensions are obtained. Two of the three samples are dipped in a solution of sodium hydroxide at 3 percent by weight and at a temperature of 50° C. for 5 minutes and for 10 minutes respectively, thereby carrying out an anti-alkaline test.

As a result of observation by an optical microscope of the substrates after being dipped in the alkaline solution, no deterioration can be found in the external appearances thereof, in spite of various duration times of dipping.

Next, using the remaining sample, a patterning treatment is performed on the ITO film by a wet etching method. It is carried out by using an etching solution comprising hydrochloric acid, a nitric acid and water in a volume ratio of 1:0.08:1, at a temperature of 45° C. With respect to the shape of the patterning, a stripe shape at a width of 300 $\mu$m at a distance of 10 $\mu$m is selected, in order to intersect the longitudinal side of the color filters at a right angle.

As a result of observation of the sample by an optical microscope, no abnormal shape can be found, especially in the patterning shape.

EXAMPLE 2

The primary and the secondary coatings are formed on the glass substrate formed with the color filters and the black stripes thereon, in the same manner as in Example 1. However, the drying is carried out for two (2) hours at a temperature of 80° C.

Next, the ITO film is formed as the transparent electrodes in the same manner as in Example 1, and the same tests are carried out.

As a result thereof, no deterioration can be found in the external appearances thereof in spite of the duration times of dipping, by the anti-alkaline test. Additionally, with respect to the patterning characteristics, no abnormal shape can be found especially in the patterning shape.

EXAMPLE 3

The primary coating is formed on the glass substitute formed with the color filters and the black stripes thereon, in the same manner as in Example 1, however, not the secondary coating.

Next, the ITO film is formed as the transparent electrodes in the same manner as in Example 1, and the same tests are carried out.

As a result thereof, no deterioration can be found in the external appearances thereof in spite of the duration times of dipping, by the anti-alkaline test. Additionally, with respect to the patterning characteristics, no particular abnormal shape can be found especially in the patterning shape.

EXAMPLE 4

The primary coating is formed on the glass substitute formed with the color filters and the black stripes thereon, in the same manner as in Example 1. However, drying after forming the primary coating is conducted under a temperature of 120° C. for 2 hours, and no secondary coating is formed.

Next, the ITO film is formed as the transparent electrodes in the same manner as in Example 1, and the same tests are carried out.

As a result thereof, a little bit of floating can be found in the ITO film or the primary coating in the case of 10 minutes time duration for the dipping in the alkaline, by the anti-alkaline test. However, no deterioration can be found in the external appearances thereof in the case of 5 minutes time duration for the dipping, and as a result, it can be decided that no problem for practical use thereof exists. Additionally, with respect to the patterning characteristics, no particular abnormal shape can be found, especially in the patterning shape.

COMPARATIVE EXAMPLE 1

On the glass substrate formed with the color filters and the black stripes that was used in the above-described Example 1, a solution obtained by dissolving an organic silicon compound of 2 g of, for example γ-methacryloxypropyltrimethoxysilane into an ethanol solvent of 200 g, is coated onto the substrate and the primary coating is formed by drying it for 2 hours under a temperature of 80° C. in a hot-air drying furnace. The thickness of the primary coating is about 100 nm. Furthermore, a secondary coating of silicone dioxide protection film is formed in the same manner as in Example 1, and the shape thereof is shown in FIG. 7.

Measuring the level difference in the step-like difference formed on the surface of the silicon dioxide protection film of the glass substrate which is obtained in the above, it is found to be about 600 nm. From this, it can be understood that a suitable degree of flattening cannot be obtained.

Next, the ITO film is formed as the transparent conductive film in the same manner as in Example 1, and the same estimation test is performed.

As a result, though a little bit of floating or exfoliation can be found in the formed film when it is dipped for 10 minutes in an alkaline solution by the anti-alkaline test, no deterioration can be found externally when it is dipped for 5 minutes. Therefore, it is concluded or decided that there is no practical problem with it.

However, in the test of the patterning characteristics, it is found that the line of the ITO film is extremely thin, in particular in the portion where it crosses over the boundary line between the color filters and the black stripes of the sub-layers. Further, there can be found many portions where the lines are apparently broken.

COMPARATIVE EXAMPLE 2

On the glass substrate formed with the color filters and the black stripes there is formed a primary coating in the same manner as in Comparative Example 1. However, no secondary coating is formed.

Next, the ITO film is formed as the transparent conductive film in the same manner as in Example 1, and the same estimation test is performed.

As a result, floating or exfoliation appears in the ITO film or in the primary coating irrespective of the dipping time in the alkaline solution, as shown by the anti-alkaline test.

In the test of the patterning characteristics, it is found that the line of the ITO film is extremely thin, in particular in the portion where it crosses over the boundary line between the color filters and the black stripes of the sub-layers. And further, there can be found many portions where the lines are apparently broken.

COMPARATIVE EXAMPLE 3

On the glass substrate formed with the color filters and the black stripes, there is formed a primary coating in the same manner as in Comparative Example 1. However, the drying temperature of the primary coating is 180° C.

Next, the ITO film is formed as the transparent conductive film in the same manner as in Example 1, and the same estimation test is performed.

As a result, though a little bit of floating can be found in the formed film when it is dipped for 10 minutes in an alkaline solution for the anti-alkaline test, no deterioration can be found externally when it is dipped for 5 minutes. As a result, it can be decided that there is no practical problem with it.

However, in the test of the patterning characteristics, it is found that the line of the ITO film is extremely thin, in particular in the portion where it crosses over the boundary line between the color filters and the black stripes of the sub-layers. Further, there can be found many portions where the lines are apparently broken.

From the examples and the comparative examples mentioned above, it is apparent that the main object of the present invention can be achieved, i.e., that the flatness can be improved on the surface of the obtained glass substrate by using the primary coating including the particles. And, from this, it is also apparent that the transparent electrode can be protected from any circuit-break. Further, it is also apparent that the anti-alkaline characteristics can be increased by providing the secondary coating on the primary coating. In addition, the anti-alkaline characteristics can be increased by forming the primary coating at a curing temperature higher than 120° C.

A summary of Examples 1 to 4 and of Comparative Examples 1 to 3 described above is shown in Table 1 on the next page.

TABLE 1

| | Manufacturing Conditions | | | Characteristics | | | |
|---|---|---|---|---|---|---|---|
| | Primary Coating | | Secondary | | | | |
| | | Curing | Coating | Flatness | | Anti-Alkaline | |
| | Particles | Temp. | (Silicon Dioxide) | Judgment | 5 Min. | 10 Min. | Judgment |
| Example 1 | Yes | 180° C. | Yes | good | no problem | no problem | very good |
| Example 2 | Yes | 80° C. | Yes | good | no problem | no problem | very good |
| Example 3 | Yes | 180° C. | No | good | no problem | no problem | very good |
| Example 4 | Yes | 120° C. | No | good | no problem | a little exfoliation | good |
| Comparative Example 1 | No | 80° C. | Yes | bad | no problem | a little exfoliation | good |
| Comparative Example 2 | No | 80° C. | No | bad | exfoliation | exfoliation | bad |
| Comparative Example 3 | No | 180° C. | Yes | bad | no problem | a little exfoliation | good |

As explained above, by the color liquid crystal substrate according to claim 1, since the primary coating of an organo silicon compound containing oxide particles is formed on the color elements and the secondary coating of a silicon dioxide is formed on the primary coating, wherein the oxide particles contained in the primary coating are concentrated in recess portions which are defined among the neighboring color filter elements, effective flattening can be obtained without increasing the thickness of the primary coating and gas generation from the resin portion of the color filters, black stripes, or the primary coating can be prevented.

And, in the manufacturing method of the color liquid crystal substrate according to claim 7 of the present invention, since the primary coating of an organo silicon compound containing oxide particles is formed by depositing and curing the solution including the organic silane composite or hydrolysate thereof on the color filter formed on the transparent substrate, and since next the secondary coating of silicon dioxide on the primary coating is formed by contacting the primary coating with hydrofluosilicic acid solution which is supersaturated with silicon dioxide, the substrate does not have to be exposed under a high temperature, thereby preventing deterioration of the color filters and the black matrix.

By the color liquid crystal substrate according to claim 10 of the present invention, since the coating of an organic silicon composite system containing oxide particles is formed on the color filter elements and further the oxide particles contained in the coating are concentrated in recess portions which are defined among the neighboring color filter elements, effective flattening can be obtained without increasing the thickness of the coating. Further, it is possible to maintain the functions of gas barrier and anti-chemical characteristics thereof.

Further, in the manufacturing method of the color liquid crystal substrate according to claim 16 of the present invention, since it is manufactured only by painting and curing a solution including an organic silicon composite or hydrolysate thereof and oxide particles, the color liquid crystal can be manufactured at a very low price.

What is claimed is:

1. A substrate for use of a color liquid crystal display, having a transparent substrate on which a plurality of color filter elements are formed, comprising:

a primary coating formed on said color elements formed of an organo silicon compound containing oxide particles; and a secondary coating formed on said primary coating formed of a silicon dioxide;

wherein said oxide particles contained in said primary coating are concentrated in recess portions which are defined among the neighboring color filter elements.

2. A substrate for use of a color liquid crystal display as defined in claim 1, wherein the size of said oxide particles are smaller than that of particles forming said color filter elements.

3. A substrate for use of a color liquid crystal display as defined in claim 1, wherein an average diameter of said oxide particles is equal to or greater than 5 nm and is equal to or less than 50 nm.

4. A substrate for use of a color liquid crystal display as defined in any one of claims 1 through 3, wherein said oxide particles are particles of silicon dioxide.

5. A substrate for use of a color liquid crystal display as defined in claim 1, wherein a thickness of said primary coating is at least 0.1 μm.

6. A substrate for use of a color liquid crystal display as defined in any one of claims 1 through 5, wherein a transparent conductive film is formed on a surface of said secondary coating.

7. A manufacturing method of a substrate for use of a color liquid crystal display, comprising:

forming a primary coating containing oxide particles, by depositing and curing a solution including organic silane or a hydrolysate thereof, which is expressed by the following equation, and including oxide particles; and forming a secondary coating of silicon dioxide on the primary coating by contacting the primary coating with a hydrofluosilicic acid solution which is supersaturated with silicon dioxide;

$$R^1{}_n Si(R^2)_{4-n}$$

wherein $R^1$ is a hydrocarbon group of 1 to 6 carbon number, a vinyl group, a methacryloxy group, an epoxy group, an amino group, a mercapto group, or an organic group including fluorine or chlorine, $R^2$ is a combined group of one or a plurality of groups selected from an alkoxy group, an alkoxyalkoxy group, an acetoxy group or a chlorine, and n is 0 to 4.

8. A manufacturing method of a substrate for use of a color liquid crystal display as defined in claim 7, wherein an average diameter of said oxide particles is equal to or greater than 5 nm and is equal to or less than 50 nm and a ratio of the oxide particles in the solution is 2 to 40 percent by weight.

9. A manufacturing method of a substrate for use of a color liquid crystal display as defined in claim 7, wherein the solution including the oxide particles is colloidal silica.

10. A substrate for use of a color liquid crystal display, having a transparent substrate on which a plurality of color filter elements are formed, wherein a primary coating of an organic silicon compound containing electrically insulating oxide particles is formed on said color filter elements, and said oxide particles contained in said coating are concentrated in recess portions which are defined among the neighboring color filter elements.

11. A substrate for use of a color liquid crystal display as defined in claim 10, wherein the size of said oxide particles are smaller than that of particles forming said color filter elements.

12. A substrate for use of a color liquid crystal display as defined in claim 10, wherein an average diameter of said oxide particles is equal to or greater than 5 nm and is equal to or less than 50 nm.

13. A substrate for use of a color liquid crystal display as defined in any one of claims 10 through 12, wherein said oxide particles are particles of silicon dioxide.

14. A substrate for use of a color liquid crystal display as defined in claim 10, wherein a thickness of said primary coating is at least 0.1 μm.

15. A substrate for use of a color liquid crystal display as defined in any one of claims 10 through 14, wherein a transparent conductive film is formed on a surface of said coating.

16. A manufacturing method of a substrate for use of a color liquid crystal display, comprising:

forming a primary coating containing electrically insulating oxide particles, by depositing and curing a solution including an organic silane or hydrolysate thereof, which is expressed by the following equation, and including electrically insulating oxide particles;

$$R^1{}_n Si(R^2)_{4-n}$$

wherein $R^1$ is a hydrocarbon group of 1 to 6 carbon number, a vinyl group, a methacryloxy group, an epoxy group, an amino group, a mercapto group, or an organic group including fluorine or chlorine, $R^2$ is a combined group of one or a plurality of groups selected from an alkoxy group, an alkoxyalkoxy group, an acetoxy group or a chlorine, and n is 0 to 4.

17. A manufacturing method of a substrate for use of a color liquid crystal display as defined in claim 16, wherein an average diameter of said oxide particles is equal to or greater than 5 nm and is equal to or less than 50 nm and a ratio of the oxide particles in the solution is 2 to 40 percent by weight.

18. A manufacturing method of a substrate for use of a color liquid crystal display as defined in claim 16, wherein the coating is heated at a temperature higher than 120° C. after being painted.

19. A manufacturing method of a substrate for use of a color liquid crystal display as defined in claim 16, wherein the solution including the oxide particles is colloidal silica.

20. A manufacturing method of a substrate for use of a liquid crystal display as defined in claim 16, wherein the oxide particles are particles of silicon dioxide.

* * * * *